Patented Oct. 30, 1945

2,388,037

UNITED STATES PATENT OFFICE 2,388,037

RUBBER COMPOSITION AND METHOD OF MAKING SAME

Stewart L. Brams, Dayton, Ohio, assignor to General Motors Corporation, Detroit, Mich., a corporation of Delaware No Drawing. Application January 30, 1943, Serial No. 474,170

4 Claims. (Cl. 260—763)

This invention relates to a composition for causing adhesion between rubber and metal and to a method for manufacturing such a composition.

An object of the invention is to provide a rubber composition which provides adhesion between rubber and metal parts (such as steel, iron, brass and aluminum). A further object of the invention is to provide a rubber compound which includes large quantities of channel carbon black mixed with rubber wherein the entire mixture is carried by suitable solvent, said mixture being capable, after application to metal and rubber parts, for causing said parts to adhere tenaciously to one another.

In carrying out the above object, it is a still further object to provide a compound which incorporates channel carbon black in quantities greater than 100% of the rubber utilized in the compound. Another object is to provide a rubber compound, used for causing adhesion between rubber and metal parts, wherein the compound includes rubber, having channel carbon black incorporated therewith in quantities greater than 100% of the rubber, a hard resinous material, preferably of the type known as cyclized rubber, together with suitable plasticizers, accelerators, age resistors, vulcanizing agents and solvents, to make the entire mixture of suitable consistency for application.

Another object of the invention is to provide a method for incorporating channel carbon black in the quantities required into the rubber.

Further objects and advantages of the present invention will be apparent from the following description.

There has been a need for a suitable cementing composition for providing adhesion bonds between rubber and metal parts. Heretofore, numerous attempts have been made to acquire such a cement but for the most part these attempts are limited to bonds wherein the metal part is brass plated and wherein a perfect coating of brass must be secured over the metal to obtain a good bond. This type of bond has proven satisfactory but is expensive and critical in its use. Other cement type of bonds have been utilized wherein the thermoplasticity of the bond is not satisfactory, wherein toxic solvents and thinners or expensive solvents and thinners have been used. The present invention is directed to a cement which eliminates the prior difficulties, is inexpensive to manufacture and provides a strong bond that may be used with or without brass plate and irrespective of the continuity of the brass plate. The use of the brass plate strengthens the bond although satisfactory bonds may be obtained by using my invention without such brass plate.

The invention is primarily concerned with a composition of rubber and channel carbon black wherein the channel carbon black is incorporated with the rubber in quantities of greater than 100% of the rubber. The channel carbon black is a hard type of carbon black which produces abrasion resistance in rubber and is highly reinforcing thereto. The mixture of rubber and channel carbon black is thinned to a suitable viscosity with a desirable solvent, such as petroleum naphtha and may then be applied to the parts to be cemented together by brushing, spraying or dipping so as to obtain a coating thereon of the cement, and then pressing the parts together under suitable pressure in a mold and curing at a desired temperature to produce an optimum adhesion bond.

In some instances, it may be desirable to use intermediate cements of conventional type rubber compounds or "tie gums"; also two coats of adhesion cement may be desirable. The adhesion layer in all cases depends upon the rubber in the material to be cemented. In other words, the type of rubber stock is very important since some stocks will adhere readily with a thin layer of dried cement while others will require the use of an intermediate "tie gum" layer or the like. In determining these factors it is best to use the trial method to obtain the desired strength of bond. Bonds between rubber and unplated metal having a tensile strength in excess of 800 lbs. per sq. inch have been obtained where the rubber stock is a 3200 lb. sq. inch type. In this instance a two coat treatment with the cement has been utilized, and the metal, a 1020 SAE steel, was cleaned by grit-blasting and acid dipping.

Specifically a formula with ranges of percentages of the various ingredients is as follows:

| | Parts |
|---|---|
| Rubber | 10 to 50 |
| Cyclized rubber or other resinous material | 0 to 30 |
| Plasticizer | 0 to 20 |
| Activator | 0 to 20 |
| Age resistor | 0 to 5 |
| Channel carbon black | 11 to 75 |
| Sulphur | 0 to 10 |
| Solvent as required. | |

In the above formula where the activator, such as zinc oxide, is used toward the upper end of the range, the quantity of channel carbon black may be reduced since both ingredients act as a reinforcing agent to some extent. In all cases the quantities of rubber and channel carbon black must be in excess of the quantity of the other ingredients and the composition must be compounded so as to produce a rubber to metal adhesion cement after curing. While the above formula gives wide variation in the quantities of ingredients to be used, it will be noted that the main ingredients are rubber and channel carbon black together with the solvent and these are the important ingredients and form the basis for the formula. The plasticizer used may be dibutyl phthalate or related compounds. The activator is preferably zinc oxide, the age resistor is preferably Sym di-beta-naphthyl-para-phenylenediamine.

In the preferred type of compound a resinous material is incorporated with the rubber such material preferably being cyclized rubber which is sold under the trade name of "Pliolite" which is a product of rubber and tin-tetra-chloride or chlorostannic acid added wherein the rubber is cyclized with the tin compound with the addition of heat and a solvent. The grade preferred is a horny, tough material which is relatively brittle at room temperature. Other materials such as hardened wood resin may be substituted for this cyclized rubber with satisfactory results as well as other rubber derivatives which act as stiffening fillers. A preferred formula which has been utilized with great success is as follows:

| | Parts |
|---|---|
| Chemically plasticized rubber | 20.5 |
| Cyclized rubber | 16.6 |
| Dibutyl phthalate | 8.6 |
| Zinc oxide (Fr. process) | 1.0 |
| Sym. di-beta-naphthyl-para-phenylenediamine | 0.8 |
| Channel carbon black | 51.5 |
| Sulphur | 1.0 |

Petroleum naphtha to secure desired viscosity.

The method of manufacturing the composition set forth herein is of particular importance and so far as I am aware the method to be described hereinafter is the only method by which large quantities of channel carbon black as noted, can be incorporated with rubber. I found it impossible to combine these two materials satisfactorily in the quantities noted on an ordinary rubber mill and have found it necessary to provide an entirely new method. The only satisfactory way to my knowledge of making this composition is to take the dry ingredients namely, rubber and channel carbon black with or without other materials and place them in an internal type mixer of the "Werner Pfleiderer" type and close the mixer except for a vent and solvent inlet. The mixer is preferably cooled by running a cooling fluid through the jacket thereof. The mixer is then started and solvent is fed in small increments at short intervals of time until the mix approximates a heavy paste or dough, whereupon the addition of solvent can be increased until a smooth homogeneous cement results. It is important that the rate of addition of the solvent and the quantities of the additions are carefully controlled, otherwise the cement will not be smooth. A specific example in the manufacture of cement by the above noted process is as follows: The rubber ingredients, channel carbon black etc., are added in the dry state to a .7 gallon Werner Pfleiderer mixer, and in this instance a total weight of 750 grams is utilized. The mixer is started and 2 cc. of petroleum naphtha solvent are added each minute until the desired dilution is reached. As the dough forms and thins the dilution may be accelerated, that is the rate of 2 cc. per minute may be increased to give the dough a desired consistency. In this instance a 2 cc. addition of solvent may occur each minute or a 2 cc. of solvent may be added during a minute period, even though the addition is continuous, in all cases the important factor being that the solvent is added very slowly and in small quantities over an extended period of time since it is especially necessary that the solvent is thoroughly mixed and that there is never a sufficient quantity present to cause the mixture to be lumpy.

In the foregoing, it will be apparent, that I have provided a new cement and method for making the same which provides strong adhesion bonds between rubber and metal parts when applied thereto and which cement is relatively inexpensive to manufacture and when manufactured by the method disclosed herein is relatively easy to compound.

While the embodiments of the present invention as herein disclosed, constitute preferred forms, it is to be understood that other forms might be adopted, all coming within the scope of the claims which follow.

What is claimed is as follows:

1. A rubber composition adapted to be used as a cement between rubber and metal parts comprising; essentially a mixture consisting of, cyclized rubber and plasticized rubber in substantially equal proportions, channel carbon black in quantities in excess of the rubber mixture, and a suitable solvent to act as a carrier for said rubber ingredient and channel carbon black.

2. A rubber composition adapted to be used as a cement between rubber and metal parts comprising; plasticized rubber—20 parts; cyclized rubber—16 parts; a plasticizer—8 parts; zinc oxide—1 part; channel carbon black 51 parts; sulphur one part together with a suitable solvent to bring the mixture to a smooth fluid consistency.

3. A rubber composition adapted to be used as a cement between rubber and metal parts comprising; chemically plasticized rubber 20.5 parts, cyclized rubber 16.6 parts, channel carbon black 51.5 parts together with suitable plasticizers, activators, age resistors, vulcanizers and a solvent to bring the entire mixture to the desired consistency.

4. In a method of making a rubber cement including a mixture of rubber and cyclized rubber in substantially equal proportions and channel carbon black wherein the channel carbon black is always present in quantities in excess of the rubber mixture, the steps comprising, supplying the mixture of rubber, cyclized rubber and channel carbon black in the dry state, to an internal type mixer, mixing the ingredients and simultaneously adding a suitable solvent in controlled small quantities until the mixture assumes a smooth dough-like consistency, and then increasing the addition of solvent until the consistency of the mixture is that desired.

STEWART L. BRAMS.